United States Patent
Kaiser et al.

(10) Patent No.: US 8,671,767 B2
(45) Date of Patent: Mar. 18, 2014

(54) PRESSURE SENSOR, IN PARTICULAR FOR A BRAKING APPARATUS

(75) Inventors: Harry Kaiser, Markgroeningen (DE); Andreas Arlt, Marbach (DE); Frieder Sundermeier, Kornwestheim (DE)

(73) Assignee: Robert Bosch GmbH, Stuttgart, DE (US)

( * ) Notice: Subject to any disclaimer, the term of this patent is extended or adjusted under 35 U.S.C. 154(b) by 135 days.

(21) Appl. No.: 13/239,742

(22) Filed: Sep. 22, 2011

(65) Prior Publication Data
US 2012/0067130 A1 Mar. 22, 2012

(30) Foreign Application Priority Data
Sep. 22, 2010 (DE) .................. 10 2010 041 169

(51) Int. Cl.
*G01L 7/00* (2006.01)
(52) U.S. Cl.
USPC ............................................................ 73/756
(58) Field of Classification Search
USPC .................................................. 73/700–756
See application file for complete search history.

(56) References Cited

U.S. PATENT DOCUMENTS

| 7,040,174 B2 * | 5/2006 | Mundry et al. ................. 73/723 |
| 8,104,357 B2 * | 1/2012 | Schlitzkus et al. ............. 73/756 |
| 2011/0203380 A1 * | 8/2011 | Philipps ........................ 73/716 |
| 2011/0247420 A1 * | 10/2011 | Humpert et al. ................ 73/700 |
| 2012/0174681 A1 * | 7/2012 | Drewes et al. .................. 73/724 |
| 2013/0086990 A1 * | 4/2013 | Hugel ............................ 73/774 |

FOREIGN PATENT DOCUMENTS

DE   10 2007 031 980   1/2009

\* cited by examiner

*Primary Examiner* — Andre Allen
(74) *Attorney, Agent, or Firm* — Maginot, Moore & Beck

(57) ABSTRACT

A pressure sensor for detecting a pressure of a medium, in particular for a braking apparatus, includes a connecting flange having a fluid channel for connection to the medium which is to be measured, a pressure measuring cell which is arranged at the end of the fluid channel, and a circuit mount, with the pressure measuring cell having a contact surface for making contact. The contact surface is arranged at an angle relative to a center axis of the pressure sensor.

22 Claims, 4 Drawing Sheets

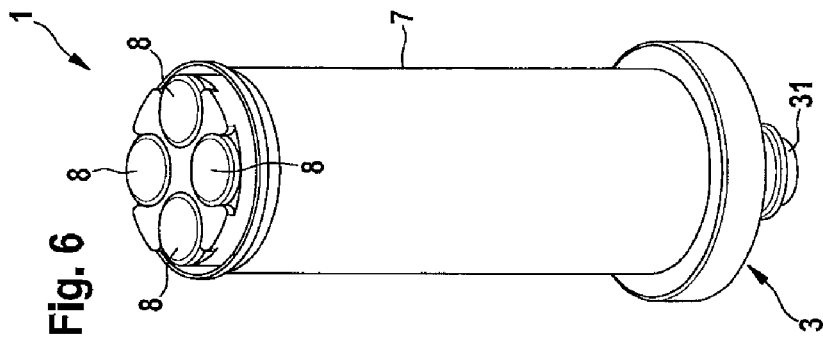
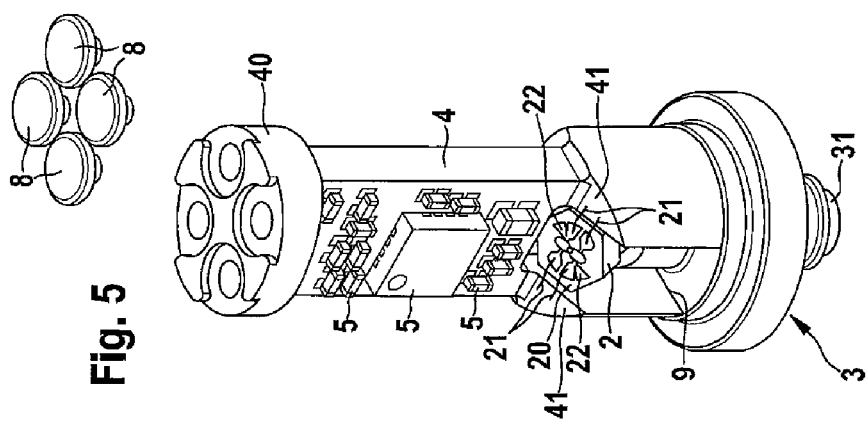
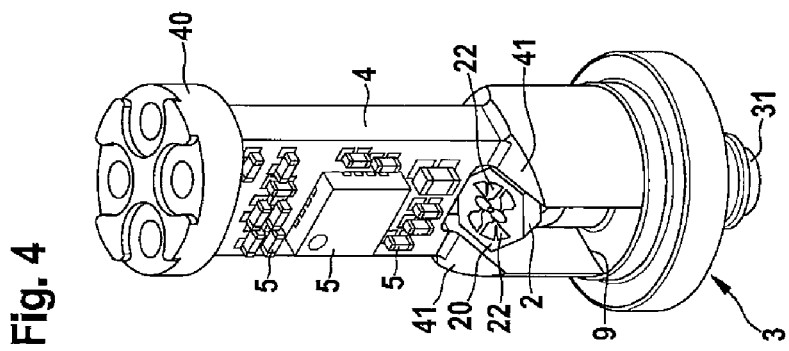

PRESSURE SENSOR, IN PARTICULAR FOR A BRAKING APPARATUS

This application claims priority under 35 U.S.C. §119 to German patent application no. DE 10 2010 041 169.8, filed Sep. 22, 2010 in Germany, the disclosure of which is incorporated herein by reference in its entirety.

BACKGROUND

The present disclosure relates to a pressure sensor for detecting a pressure, in particular in braking apparatuses of vehicles.

Various designs of pressure sensors are known from the prior art. Known pressure sensors are used, for example, in braking systems for vehicles in order to detect a pressure of the brake fluid. In this connection, DE 10 2007 031 980 A1 discloses a pressure sensor which has a centrally arranged pressure measuring cell. A mount element and a printed circuit board which is fixed to it are also provided. Pressure sensors of this kind are established in principle, but there is a need for future braking devices to be both cost-effective to manufacture and for the pressure sensors to be miniaturized further. A large number of pressure sensors will be used in the future, particularly in high-priced vehicles, and therefore the pressure sensors have to have the smallest possible installation spaces.

SUMMARY

In contrast, the pressure sensor according to the disclosure having the features of Claim 1 has the advantage that further miniaturization is possible in comparison to the pressure sensors which have been known to date. The pressure sensor according to the disclosure has a very compact design and also has a high degree of robustness, and therefore the pressure sensor can have a long service life. In this case, the pressure sensor according to the disclosure can be used, in particular, over the entire service life of a vehicle without having to be replaced. In spite of the further miniaturization, the pressure sensor according to the disclosure has both a high mechanical strength and also very reliable electrical connections. According to the disclosure, this is achieved by the pressure sensor comprising a pressure measuring cell having a contact surface for making contact, with the contact surface being arranged at an angle relative to a center axis of the pressure sensor. Therefore, more installation space can be saved on account of the inclined position, according to the disclosure, of the pressure measuring cell, and therefore further miniaturization of the pressure sensor is possible.

Preferred developments of features of the disclosure are also set forth below.

The circuit mount preferably has at least one contact area which is arranged approximately at the same angle as the contact surface of the pressure measuring cell relative to the center axis of the pressure sensor. As a result, contact can be made between the pressure measuring cell and the circuit mount in a particularly simple manner. Furthermore, the compactness of the pressure sensor can be further improved as a result. In this case, the circuit mount particularly preferably has one or two contact areas at the same angle as the contact surface of the pressure measuring cell. The contact surface of the pressure measuring cell is preferably arranged between the two contact areas of the circuit mount.

In order to provide a particularly robust pressure sensor, contact is made between the pressure measuring cell and the circuit mount by means of bonding contacts. It has been found here that the bonding contacts, which constitute a conventional production method, provide proven electrical connections which last longer than an entire life cycle of the pressure sensor.

The compactness of the pressure sensor according to the disclosure can be further improved by a channel in the connecting flange preferably being angled.

A center axis of the circuit mount is further preferably arranged in such a way that it coincides with the center axis of the pressure sensor. Therefore, the circuit carrier is arranged in the center of the pressure sensor and a diameter of the pressure sensor can be chosen to be as small as possible.

For simple assembly, a hole/pin connection is preferably provided between the circuit mount and the connecting flange.

The circuit mount preferably comprises a C-shaped recess in which the pressure measuring cell is at least partially accommodated.

In order to further protect the contacts between the pressure measuring cell and the contact area of the circuit mount, the pressure sensor preferably comprises a protective material which is arranged over the contacts and surrounds said contacts. The protective material used is preferably an elastic gel or the like. In particular, the protective material also covers the contact surface of the pressure measuring cell.

In order to protect the components of the pressure sensor as well as possible, a substantially cylindrical protective sleeve is preferably provided. The protective sleeve can be connected to the components of the pressure sensor, for example, by means of a clamping connection or a plurality of welded connections.

The circuit mount according to the disclosure is preferably an MID (Molded Interconnect Device) component, and particularly preferably a 2-component MID in which a plastic premold is produced from a first plateable plastic and a second non-plateable plastic, and the projecting surfaces of the premold are then coated with a metallic surface by means of a plating process.

The pressure measuring cell is preferably of hexagonal design. The pressure sensor further preferably comprises a horizontal mount plate on which contact rivets can be arranged and by means of which a connection to a controller can be established.

The pressure sensor according to the disclosure is preferably used in vehicles in hydraulic applications, in particular in brakes. Since a plurality of pressure sensors are sometimes incorporated in modern brake systems, a great saving in installation space can be made according to the disclosure.

The disclosure therefore also relates to a brake system having at least one pressure sensor according to the disclosure.

BRIEF DESCRIPTION OF THE DRAWINGS

A preferred exemplary embodiment of the disclosure will be described in detail below with reference to the accompanying drawing, in which FIGS. 2 to 6 show schematic, perspective views of the assembly of the pressure sensor according to the disclosure.

DETAILED DESCRIPTION

A pressure sensor 1 according to a preferred exemplary embodiment of the disclosure will be described in detail below with reference to FIGS. 1 to 7.

Figure 1:
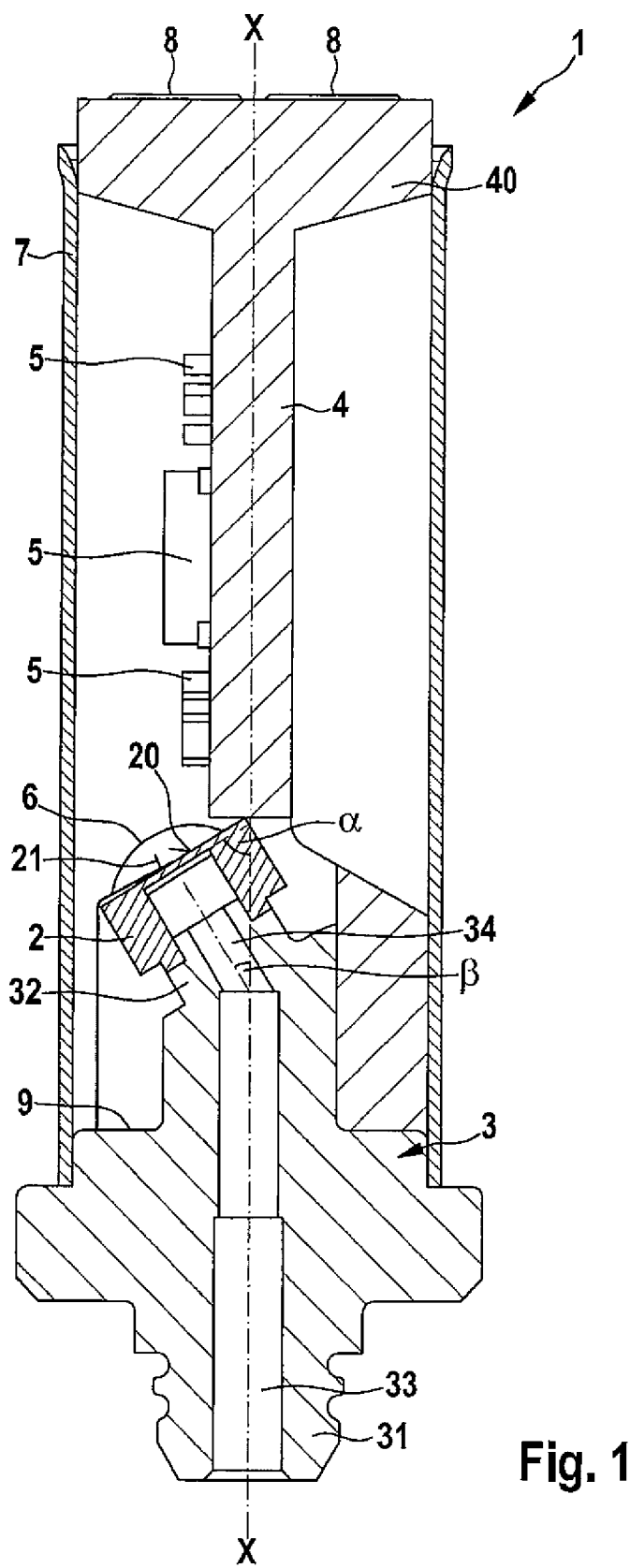
FIG. 1 shows a schematic sectional view of a pressure sensor according to one exemplary embodiment of the disclosure.

As can be seen in FIG. 1, the pressure sensor 1 comprises a pressure measuring cell 2 and a connecting flange 3. The connecting flange 3 has a connection 31 in which a fluid channel 33 runs, the medium, of which the pressure is to be measured, being supplied via said fluid channel. The fluid channel 33 has an angled fluid channel region 34. A holder 32 for holding the pressure measuring cell 2 is provided at the end of the angled fluid channel region 34. The connecting flange 3 is connected to a hydraulic block (not illustrated) by means of the connection 31.

Figure 2:
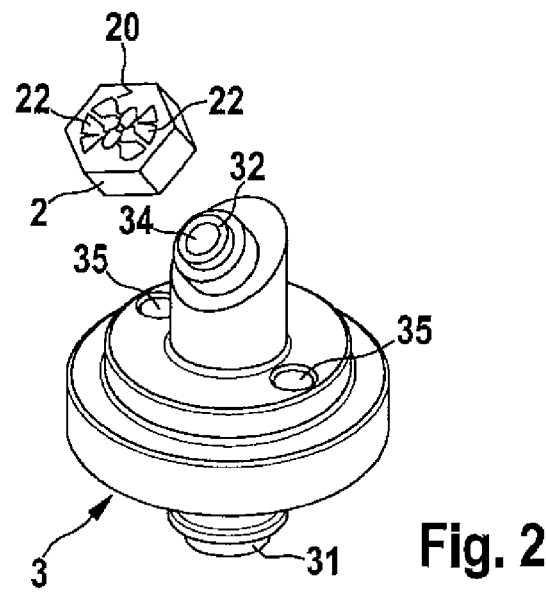

The pressure sensor 1 further comprises a circuit mount 4 on which a large number of electronic components 5 is arranged. The pressure measuring cell 2 is, as can be seen in FIG. 2 in particular, of hexagonal form and has a contact surface 20 on which a large number of contacts 22 are formed. In the assembled state, the contact surface 20 of the pressure measuring cell 2 is arranged at an angle $\alpha$ of 60° relative to a center axis X-X of the pressure sensor 1. As can further be seen in FIG. 4, the circuit mount 4 comprises two side contact faces 41 which are likewise inclined at the same angle relative to the center axis X-X as the contact surface 20 of the pressure measuring cell 2. The pressure measuring cell 2 is connected to the contact areas 41 of the circuit mount 4 by means of a plurality of bonding wires 21. For a particularly compact design, the circuit mount 4 has a C-shaped recess 43 in which the pressure measuring cell 2 is partly arranged.

As can further be seen in FIG. 1, an elastic gel 6 is applied over the bonding wires 21 as a protective material. As a result, the contact between the pressure-measuring cell 2 and the circuit mount 4 is protected.

Figure 3:
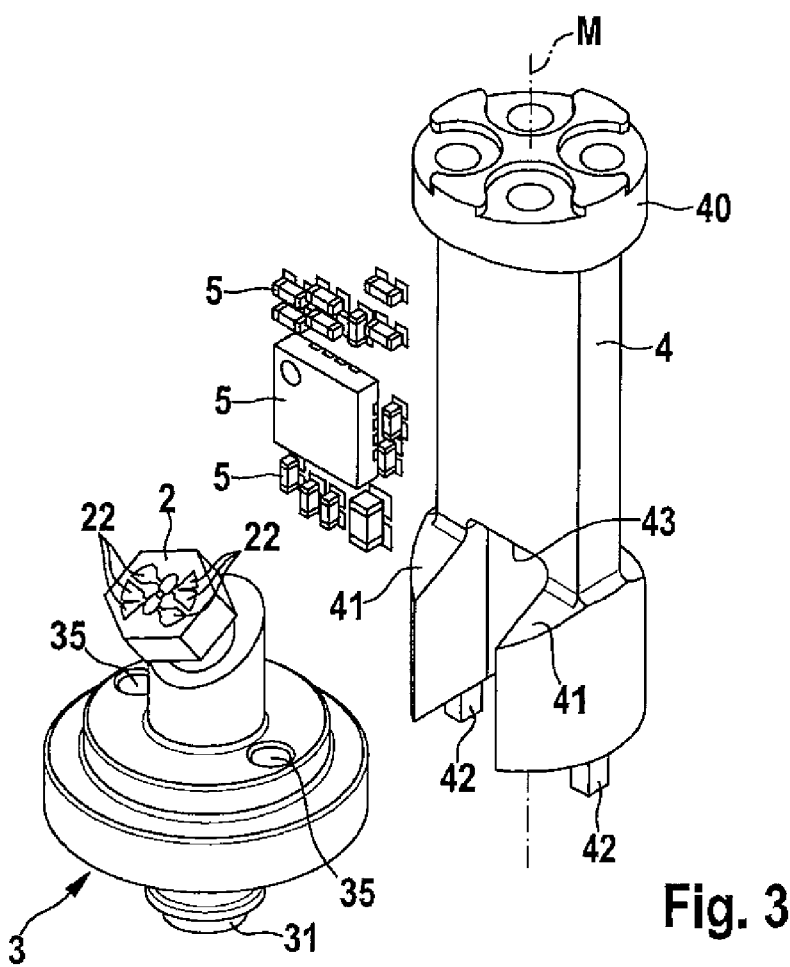

The circuit mount 4 further has a horizontal mount plate 40 which is arranged in an end region of the circuit mount 4 and is designed to hold contact rivets 8. At the opposite end, the circuit mount 4 has two pins 42 which, as can be seen in FIG. 3, can be inserted into correspondingly formed holes 35 in the connecting flange 3. An adhesive connection 9 is further applied for the purpose of better fixing between the connecting flange 3 and the circuit mount 4 (compare FIGS. 1 and 4).

The circuit mount 4 has a plate-like design, with a center axis M of the circuit mount 4 coinciding with the longitudinal axis X-X of the pressure sensor 1. In this exemplary embodiment, the circuit mount 4 is populated only on one side, however it is possible for the circuit mount 4 to also be populated on both sides. In this case, the circuit mount 4 is preferably produced using 2-component MID technology. Here, electrically conductive tracks are produced on an upper face of the circuit mount 4 and the electronic components 5 are mounted on said tracks by means of conductive adhesive. However, instead of 2-component MID technology, the circuit mount 4 can, in principle, also be produced with alternative MID technologies, for example LDS (Laser Direct Structuring), hot-stamping etc., or as an injection-molded part with insert parts.

The order of assembly of the pressure sensor 1 is clear from FIGS. 2 to 6. First, the pressure measuring cell 2 is mounted on the connecting flange 3, preferably by means of welding, at the holder 32 at the end of the angled fluid channel region 34 (compare FIG. 2). After the base of the circuit mount 4 is produced, it is populated with the electronic components 5 (FIG. 3). The circuit mount 4 is then inserted into the holes 35 in the connecting flange 3 by way of the pins 42 and an adhesive connection 9 is formed between the two components (compare FIG. 4). In a next step, a bonding contact-connection is made between the contacts 22 on the contact surface 20 of the pressure measuring cell 2 and the contact areas 41 of the circuit mount 4. This allows a very reliable contact-connection with a long service life. The elastic gel 6 is then applied over the bonding contacts 21 in order to provide additional protection for the bonding contacts 21 and also the measuring membrane of the pressure measuring cell 2. In a last step, the four contact rivets 8 are adhesively bonded into the carrier plate of the circuit mount 4 by means of silver conductive adhesive, for example, and the protective sleeve 7 is guided over the circuit mount 4 and connected to the connecting flange 3 by means of a press-fit. As an alternative or in addition, the protective sleeve 7 can additionally be fixed to the connecting flange 3 by means of welded connections. The protective sleeve 7 serves as a mechanical protection means for the pressure sensor and can also divert overvoltages, for example ESD pulse, which occur to the connecting flange 3.

Figure 7:
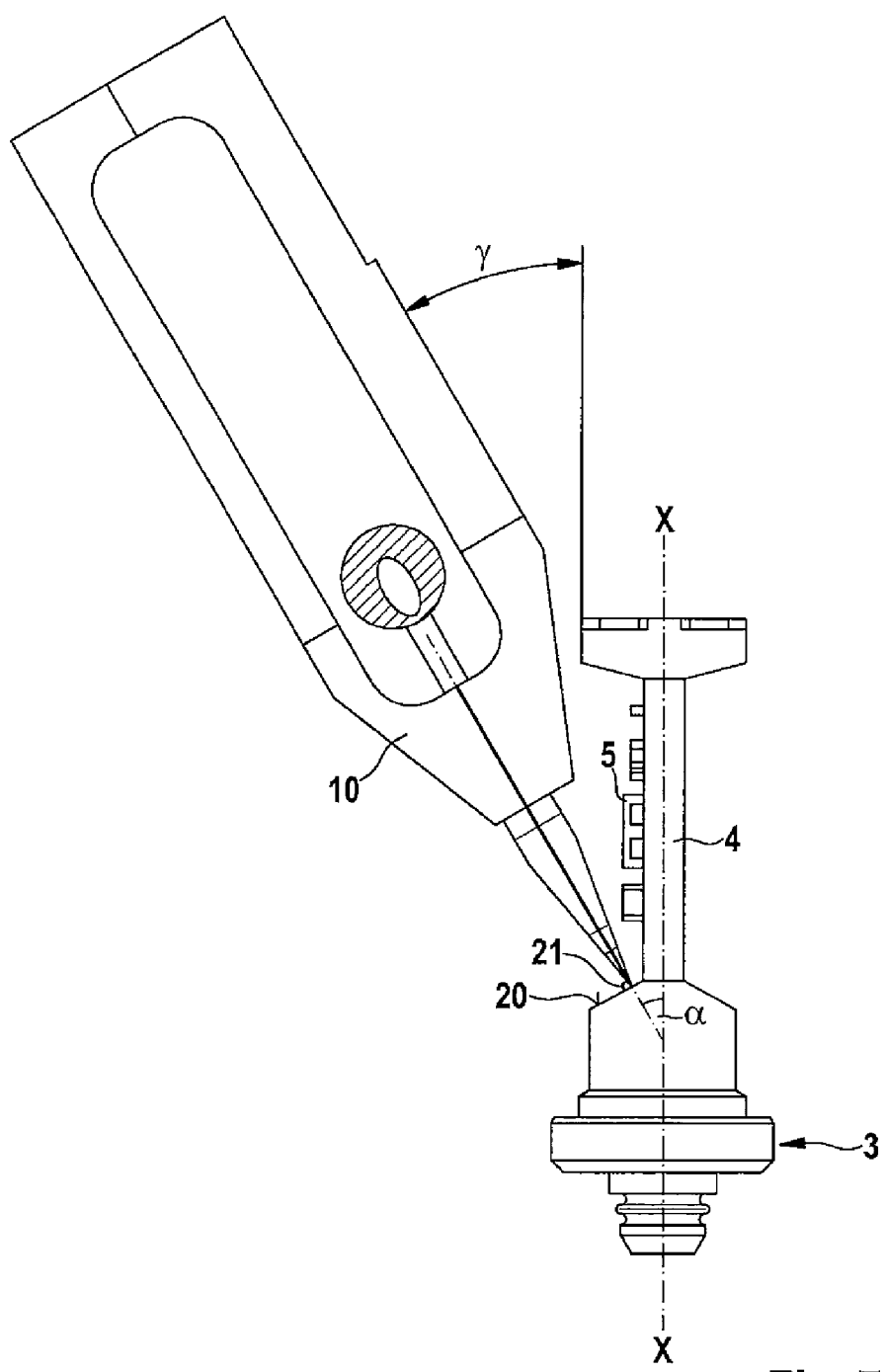
FIG. 7 shows a schematic side view of a contact-making process at the pressure sensor.

FIG. 7 schematically shows the bonding method, with a bonding tool 10 being used for the bonding process, with the bonding tool 10 being oriented at an angle $\gamma$ of approximately 30° relative to the center axis X-X of the pressure sensor, and the bonding wires 21 being applied to the circuit mount 4 in order to make contact with the pressure measuring cell 21. As is clear from FIG. 7, the bonding process is considerably simplified on account of the inclined contact surface 20 of the pressure measuring cell 2 since more space is available for the bonding tool 10. In particular, the bonding tool 10 can also apply the bonding wires perpendicular to the contact surface 2.

The pressure sensor 1 according to the disclosure therefore has a pressure measuring cell with an inclined contact surface 20, and therefore a reliable bonding contact with a very long service life is possible between the pressure measuring cell 2 and the circuit mount 4. Therefore, a proven manner of connection, such as bonding, can be used according to the disclosure in order to establish the contact. As an alternative, the connection could also be established by means of welding or soldering. In this case, the pressure sensor according to the disclosure has a minimum number of components and, in particular on account of the circuit mount 4 being directly populated, a printed circuit board with a separate carrier plate as is usually used can be dispensed with. A maximum diameter of the connecting flange 3 is preferably 8 mm in this case. Therefore, it is possible, for example in the future, for up to four pressure sensors to be able to be incorporated in premium braking devices. Furthermore, on account of the design of the circuit mount 4, said circuit mount also takes on a mechanical carrier function in the pressure sensor 1, and therefore correspondingly expensive, separate supporting elements in the pressure sensor can be dispensed with.

What is claimed is:

1. A pressure sensor for detecting a pressure of a medium, the pressure sensor including a center axis extending longitudinally along the pressure sensor, the pressure sensor comprising
    a connecting flange having a fluid channel for connection to the medium which is to be measured;
    a pressure measuring cell which is arranged at the end of the fluid channel; and
    a circuit mount,
    wherein the pressure measuring cell has a contact surface for making contact, the contact surface being arranged at an inclined angle relative to the center axis of the pressure sensor.

2. The pressure sensor according to claim 1, wherein the circuit mount has at least one contact area which is arranged approximately at the same inclined angle as the contact surface of the pressure measuring cell relative to the center axis of the pressure sensor.

3. The pressure sensor according to claim 1, wherein contact is made with the pressure measuring cell by bonding contacts.

4. The pressure sensor according to claim 1, wherein the fluid channel in the connecting flange has an angled fluid channel region, wherein the angled fluid channel region is inclined with respect to the center axis of the pressure sensor.

5. The pressure sensor according to claim 1, wherein the circuit mount has a center axis which coincides with the center axis of the pressure sensor.

6. The pressure sensor according to claim 1, further comprising a hole/pin connection between the circuit mount and the connecting flange.

7. The pressure sensor according to claim 1, wherein the circuit mount has a C-shaped recess in which the pressure measuring cell is at least partially accommodated.

8. The pressure sensor according to claim 1, wherein the angle between the center axis of the pressure sensor and the inclined angle of the contact surface of the pressure measuring cell is between 50° and 70°.

9. The pressure sensor according to claim 3, further comprising a protective material which is arranged over the bonding contacts.

10. The pressure sensor according to claim 1, further comprising a protective sleeve configured and arranged to protect the pressure sensor.

11. The pressure sensor of claim 1 wherein the pressure sensor is configured to be used in a braking apparatus.

12. The pressure sensor according to claim 8, wherein the angle between the center axis of the pressure sensor and the inclined angle of the contact surface of the pressure measuring cell is approximately 60°.

13. The pressure sensor according to claim 9, wherein:
the protective material includes an elastic gel, and
the elastic gel is arranged over the contact surface of the pressure measuring cell.

14. The pressure sensor according to claim 4, the contact surface of the pressure measuring cell including a plurality of contacts and the circuit mount including at least one contact area, wherein a connection is made between the plurality of contacts and the contact area of the circuit mount.

15. The pressure sensor according to claim 14, wherein the fluid channel in the connecting flange has a longitudinal channel region coupled to the angled fluid channel region, wherein the longitudinal fluid channel region coincides with the center axis of the pressure sensor.

16. The pressure sensor according to claim 15, the circuit mount including a C-shaped recess in which the pressure measuring cell is at least partially accommodated.

17. The pressure sensor according to claim 1 wherein the inclined angle is neither parallel to nor perpendicular with the center axis.

18. The pressure sensor according to claim 17 wherein the contact surface is configured to support electrical contacts, the electrical contacts being arranged at the inclined angle relative to the center axis of the pressure sensor.

19. A pressure sensor for detecting a pressure of a medium, the pressure sensor including a center axis extending longitudinally along the pressure sensor, the pressure sensor comprising
a connecting flange having an angled fluid channel inclined with respect to the center axis of the pressure sensor for connection to the medium;
a pressure measuring cell which is arranged at the end of the angled fluid channel, the pressure measuring cell including a contact surface inclined at an angle relative to the center axis of the pressure sensor, the contact surface including a plurality of contacts; and
a circuit mount including at least one contact area, wherein a connection is made between at least one of the plurality of contacts and the contact area of the circuit mount.

20. The pressure sensor according to claim 19 wherein the at least one contact area is arranged approximately at the same inclined angle as the contact surface of the pressure measuring cell relative to the center axis of the pressure sensor.

21. The pressure sensor according to claim 20 wherein the circuit mount includes a recess in which the pressure measuring cell is at least partially accommodated.

22. The pressure sensor according to claim 21 wherein the connection between the at least one of the plurality of contacts of the contact surface of the pressure measuring cell and the contact area of the circuit mount is made by at least one bonding wire.

* * * * *